United States Patent
Gentili et al.

(10) Patent No.: US 8,720,396 B2
(45) Date of Patent: May 13, 2014

(54) SPLIT-CYCLE ENGINE

(75) Inventors: Roberto Gentili, Pisa (IT); Riccardo Rossi, Castelnuovo di Garfagnana (IT); Ettore Musu, Fauglia (IT)

(73) Assignee: Green Engine Consulting S.R.L., Pisa (IT)

( * ) Notice: Subject to any disclaimer, the term of this patent is extended or adjusted under 35 U.S.C. 154(b) by 37 days.

(21) Appl. No.: 13/395,484

(22) PCT Filed: Sep. 23, 2010

(86) PCT No.: PCT/IB2010/002388
§ 371 (c)(1),
(2), (4) Date: Mar. 12, 2012

(87) PCT Pub. No.: WO2011/045642
PCT Pub. Date: Apr. 21, 2011

(65) Prior Publication Data
US 2012/0167566 A1    Jul. 5, 2012

(30) Foreign Application Priority Data
Sep. 23, 2009 (IT) ................. PI2009A0117

(51) Int. Cl.
*F02B 25/00* (2006.01)
(52) U.S. Cl.
USPC ...................................... 123/70 R
(58) Field of Classification Search
USPC ........................................ 123/70 R
See application file for complete search history.

(56) References Cited

U.S. PATENT DOCUMENTS

| | | | |
|---|---|---|---|
| 4,157,080 A | 6/1979 | Hill | |
| 4,506,634 A | 3/1985 | Kerrebrock | |
| 4,565,167 A * | 1/1986 | Bryant | 123/70 R |
| 4,791,787 A * | 12/1988 | Paul et al. | 60/605.1 |
| 5,228,415 A | 7/1993 | Williams | |
| 5,499,605 A | 3/1996 | Thring | |
| 6,340,004 B1 | 1/2002 | Patton | |
| 7,219,630 B2 * | 5/2007 | Patton | 123/25 C |
| 2005/0199191 A1 | 9/2005 | Loth | |
| 2008/0210197 A1 * | 9/2008 | Smith | 123/321 |
| 2009/0038597 A1 * | 2/2009 | Phillips | 123/70 R |
| 2009/0255491 A1 * | 10/2009 | Heaton | 123/54.2 |

FOREIGN PATENT DOCUMENTS

| | | |
|---|---|---|
| DE | 2812199 A1 | 8/1980 |
| WO | 0134954 A1 | 5/2001 |
| WO | 2009020488 A1 | 2/2009 |
| WO | 2009020489 A1 | 2/2009 |
| WO | 2009020490 A1 | 2/2009 |
| WO | 2009020491 A1 | 2/2009 |
| WO | 2009020504 A1 | 2/2009 |

* cited by examiner

*Primary Examiner* — Lindsay Low
*Assistant Examiner* — Charles Brauch
(74) *Attorney, Agent, or Firm* — Ladas & Parry LLP

(57) ABSTRACT

A compression-ignition "split-cycle" engine (100) having: a cylinder block with an expansion cylinder having an expansion piston that moves alternatively between a top dead center (ETDC) and a bottom dead center (EBDC) by a crankshaft mechanism that causes a predetermined position of the expansion piston to correspond to a predetermined crankshaft angle; a compression cylinder having a compression piston adapted to move alternatively between a CTDC and a CBDC according to a predetermined angular phase shift in delay to the expansion piston; a cylinder head that closes the cylinders and comprises a crossover passageway with an opening in constant communication towards compression cylinder and an opening having a transfer valve towards expansion cylinder, an intake valve and an exhaust valve; means for opening/closing the transfer valve; means for opening/closing exhaust valve at predetermined moments of the alternative cycle of the pistons, and a fuel injector in the crossover passageway.

19 Claims, 4 Drawing Sheets

SPLIT-CYCLE ENGINE

FIELD OF THE INVENTION

The present invention relates to a "split-cycle" compression-ignition engine, with introduction of fuel and comburent fluid in the expansion cylinder in the combustion phase.

DESCRIPTION OF THE PRIOR ART

As well known, conventional compression-ignition engines carry out the cycle in a single cylinder, in which firstly there is an intake of air, which is then compressed; then fuel is injected an ignited owing to the high temperature reached by air owing to the compression; the steps follow of expansion and of exhaust. The peculiar combustion mode of said engines has the consequence of highly polluting emissions of carbonaceous dust and nitrogen oxides.

Various solutions have been proposed for reducing said emissions and are based on improvements of the injection system and also on particular strategies of intake and mixture of the fuel with air, according to the principle of homogeneous combustion, among which known techniques such as HCCI, PCCI, MK, etc.

However in all these techniques, for controlling the combustion progress, it is necessary the presence in the cylinder of a high percentage of burnt gas, which limit the available specific power. Other disadvantages, in species due to some of these techniques, are the high pressure gradient in the combustion phase, which involves both noise, and high mechanical stress.

Solutions are also known, which are called "split-cycle", where the steps of intake and of compression are accomplished out of the cylinder in which the steps of combustion and exhaust occur (expansion cylinder). More precisely, the chamber in which the steps occur of intake and compression normally consists of a second cylinder (compression cylinder). "Split-cycle" solutions have been proposed and applied both in compression-ignition engines and in spark-ignition engines with different purposes.

In WO2009020488, WO2009020489, WO2009020490, WO2009020491 and WO2009020504 in the name of Scuderi, a "split cycle" engine is described having a cylinder block with a compression cylinder and an expansion cylinder closed by a cylinder head in which one or more passageways (78) are provided, called "crossover", closed at the respective ends by a compression-sided valve (84) and a combustion-sided valve (86). Each crossover passageway defines a pressurized chamber (81), in which pressurized gas can be accumulated when both the compression-sided valves and combustion-sided valve are closed. In the passageways (78) the injection of petrol is provided by an injector (90) that injects petrol into the compressed air present in the crossover passageways. At least one spark-plug (92) is provided in the expansion cylinder for ignition of the mixture.

Even if in the cited patent documents the possible application of the system to compression-ignition engines is cited, it is observed that this application is not feasible. In fact, differently from the case of spark ignition engines, in case of compression-ignition engines the injection in the crossover would cause in it also the ignition of the fuel. This would give rise to an unbearable thermal stress of the combustion-sided valves, The presence of the latter would cause also a low efficiency for pressure drop during the passage of the combustion gas through the valve.

Furthermore, in the engine described in the cited documents, as the combustion-sided opens a strong pressure difference is present between the compression cylinder and the expansion cylinder, with subsequent loss of efficiency owing to strong fluid dynamic loss.

In U.S. Pat. No. 6,340,004 an engine is described of the same kind as described above that provides a crossover passageway having respective valves at the inlet and at the outlet openings. The duct comprises, furthermore, a regenerator of the combustion gas for accumulating part of the heat of a cycle and exploiting it for a successive cycle.

In U.S. Pat. No. 4,157,080A and in DE2812199 engines are described that provide a supercharging step and two pistons of the compression cylinder and of the combustion cylinder that are shifted 180° from each other.

SUMMARY OF THE INVENTION

It is a feature of the present invention to provide a compression-ignition "split-cycle" engine that causes low emissions of dust.

It is a further feature of the present invention to provide a compression-ignition engine that causes low emission of nitrogen oxides.

It is also a feature of the present invention to provide a compression-ignition engine that makes it possible to obtain high values of efficiency and of specific power.

It is another feature of the present invention to provide a compression-ignition engine for reducing the pressure gradient in the combustion phase and then the noise and the high mechanical stress deriving from such pressures.

It is a further feature of the present invention to provide a compression-ignition engine that is structurally easy and not expensive to make.

These and other objects are achieved by a compression-ignition "split-cycle" engine comprising:
  a cylinder block:
  an expansion cylinder having an expansion piston that is adapted to move alternatively in said expansion cylinder between a top dead center (ETDC) and a bottom dead center (EBDC) by a crankshaft mechanism, said crankshaft mechanism causing always a predetermined position of said expansion piston to correspond to a predetermined crankshaft angle;
  a compression cylinder having a compression piston that is adapted to move alternatively in said compression cylinder between a top dead center (CTDC) and a bottom dead center (CBDC) according to a predetermined angular phase shift in delay with respect to the crankshaft angle of said expansion cylinder, said compression cylinder arranged adjacent to said expansion cylinder;
  a cylinder head that closes said compression and expansion cylinders and in which at least one crossover passageway is provided that connects said cylinders and comprises a compression-sided opening and an expansion-sided opening, said cylinder head comprising at least one intake valve which faces said compression cylinder for inlet of a comburent fluid in said compression cylinder and at least one exhaust valve that faces said expansion cylinder for exhaustion of burnt gas exiting from said expansion cylinder;
  at least one transfer valve arranged at the compression-sided opening of the crossover passageway;
  a means for causing an open and close movement of said transfer valve at predetermined moments of the alternative cycle of said pistons;
  a means for causing an open and close movement of said exhaust valve at predetermined moments of the alternative cycle of said pistons;

a means for injecting fuel into said crossover passageway or in said expansion cylinder at predetermined moments of the alternative cycle of said pistons so that a compression-ignition of the fuel injected occurs at reaching a compression-ignition temperature;

characterized in that said crossover passageway defines a single combustion chamber in combination with said expansion cylinder with which it is in constant communication, in that said means for causing an open and close movement of said transfer valve opens said transfer valve in advance with respect to the crankshaft angle of said ETDC, with an advance open movement higher or equal to 20° of crankshaft angle, in such a way that:

from the opening instant of said transfer valve up to reaching said ETDC there is a substantial equalization of instantaneous pressure between said compression cylinder and said expansion cylinder, and between said ETDC and said CTDC substantially a total transfer of said comburent fluid occurs between said compression cylinder and said expansion cylinder through said crossover passageway;

and in that said means for injecting fuel injects said fuel starting from the achievement of said ETDC by said expansion piston, such that said injection of fuel occurs simultaneously to the transfer of said comburent fluid through said crossover passageway.

This way, before opening the transfer valve there are substantially only two chambers, one defined by the compression cylinder and the other defined by the crossover passageway in combination with said expansion cylinder. Then, when opening said transfer valve, which is carried out at least 20° in advance with respect to the ETDC, there is not a substantial transfer of comburent fluid into said crossover passageway, since the pressure in the expansion cylinder is about equal to that compression cylinder. With the progress of the cycle, since the two cylinders communicate with each other via the crossover passageway, the pressure increases in a way identical everywhere, by the contemporaneous rising stroke of the two pistons, up to reaching the ETDC. Then, passed the ETDC, the compression piston continues to rise and the expansion piston starts to go down, causing a total transfer of said comburent fluid between the two cylinders through the crossover passageway. Simultaneously to the transfer, the injection is carried out and a subsequent combustion of all the fuel occurs. Since the transfer causes a high turbulence, the phenomena of evaporation and mixing between the fuel and the comburent fluid occur in a better way than in a conventional diesel engine. In particular, the evaporation is carried out in a quicker way and the mixture obtained is much more homogeneous. This way, a very effective combustion is obtained and a subsequent very low fraction of unburnt particles is present in the exhaust gas, in particular carbonaceous dust.

Furthermore, since pressures between compression cylinder and expansion cylinder are substantially alike or very close during the transients of opening and closing the valve between the expansion cylinder and the crossover passageway, the loss for lamination are very low.

In particular, the means for causing an open and close movement of the transfer valve opens the transfer valve in advance with respect to the crankshaft angle of the ETDC, according to an advance angle set between −80° and −25°, in particular between −35° and −30°.

In particular, the means for injecting fuel are adapted to inject a small amount of fuel so-called pilot injections in advance with respect to the ETDC in such a way that it is suitable for heating the combustion environment. This way, the pilot injections allow ensuring a direct ignition of the fuel injected starting from the achievement of the ETDC.

Advantageously, said means for causing an open and close movement of said exhaust valve is adapted to block said exhaust valve with a predetermined advance with respect to the achievement by said expansion piston of said ETDC, so that in said expansion cylinder a compression occurs of a part of exhaust gas up to a predetermined pressure, and said means for causing an open and close movement of said transfer valve opens said transfer valve when said compression piston has compressed comburent fluid in said compression cylinder up to a pressure substantially equal to that present in said expansion cylinder, such that said transfer of said comburent fluid through said crossover passageway from said compression cylinder to said expansion cylinder and the autoignition of the fuel are carried out substantially at the same time. This makes it possible to eliminate the mechanical problems and of tightness that would be caused by the presence of a further expansion-sided transfer valve arranged at the opening of the crossover passageway facing the expansion cylinder.

This way, the compressed charge of fuel and comburent fluid is transferred into the combustion cylinder in the combustion phase through said crossover passageway, after opening the transfer valve. Therefore, the crossover passageway has a pure transfer function and is not simply a pressurized storage reservoir of the comburent fluid.

Alternatively, said means for causing an open and close movement of said transfer valve opens said transfer valve in advance with respect to closing said exhaust valve, so that in the expansion cylinder a washing out occurs with fresh comburent fluid of the exhaust gas occurs before closing said exhaust valve. Even in this case, when closing the exhaust valve there is a congruent growth of the pressure in the two compression and expansion cylinders, with possibility to reach a larger power.

Advantageously, said angular phase shift between the crankshaft angle of said compression piston with respect to the crankshaft angle of said expansion piston is set between 10° and 45°, preferably between 20° and 30°, in particular of 25°. The angular phase shift between said compression piston and said expansion piston has the aim to cause the transfer of the comburent fluid compressed by said compression cylinder to said expansion cylinder.

Advantageously, an adjustment means is provided for adjusting the angular phase shift between said compression piston and said expansion piston versus the operation conditions of the engine.

In particular, said crankshaft mechanism comprises a single drive shaft that operates said compression piston and said expansion piston.

Alternatively, said crankshaft mechanism comprises a first drive shaft that operates said expansion piston and a second drive shaft that operates said compression piston, said first and second drive shaft being connected to each other such that they maintain a same speed of rotation.

In a possible exemplary embodiment, said crankshaft mechanism of said pistons of said compression cylinder and of said expansion cylinder is of the type master connecting rod-link rod.

In particular, said means for injecting comprises at least one injector, in particular an pressurized injector, which faces said crossover passageway or is arranged in said expansion cylinder.

In a further exemplary embodiment of the engine, several crossover passageways are provided between said expansion cylinder and said compression cylinder, wherein each of said crossover passageways has at least one respective transfer valve arranged at the compression-sided opening of the crossover passageway, and is in constant communication with said expansion cylinder. This solution is feasible for example for high-powered engines.

Advantageously, said engine is associated with a supercharger that is adapted to provide a higher specific power for the engine and also a better thermodynamic efficiency.

In particular, said compression cylinder and said expansion cylinder have a same displacement or a different displacement, in the latter case it is advantageous that the higher displacement is that of the expansion cylinder. thus a cycle with a more complete expansion is obtained.

In a possible exemplary embodiment, said engine can comprise a plurality of compression cylinders associated respectively to a plurality of expansion cylinders variously arranged and combined to each other.

In a possible exemplary embodiment, said crossover passageway provides an adjusting element that is adapted to adjust the cross section and/or the volume of said crossover passageway in order to fit it to the different operation conditions of the engine.

In particular, said adjusting element can be conformed as a bolt or a blade.

BRIEF DESCRIPTION OF THE DRAWINGS

The invention will be made clearer with the following description of an exemplary embodiment thereof, exemplifying but not limitative, with reference to the attached drawings in which.

DESCRIPTION OF SOME PREFERRED EXEMPLARY EMBODIMENTS

Figure 1:
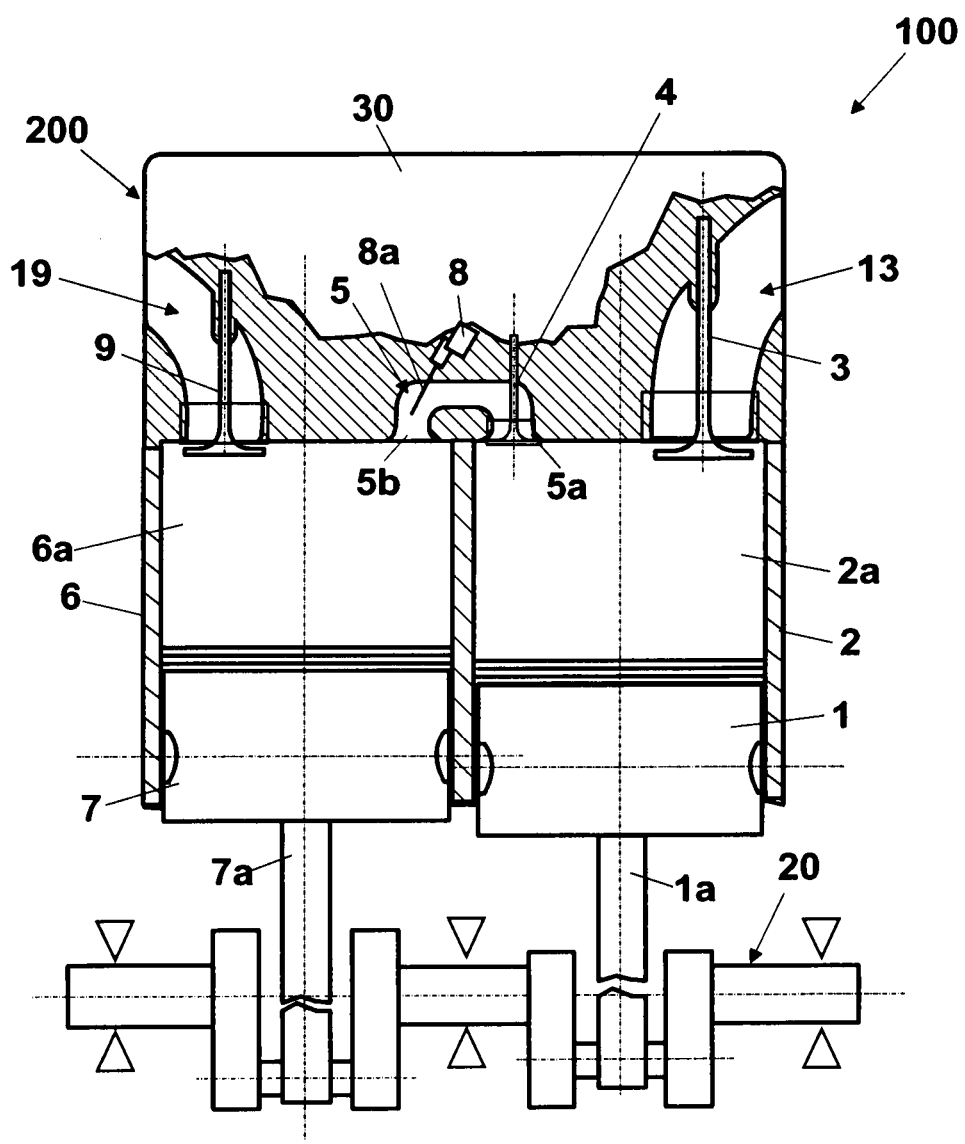
FIG. 1 diagrammatically shows a cross sectional view of an exemplary embodiment of a compression-ignition engine, according to the invention, in a phase of the engine cycle.
Figure 2:
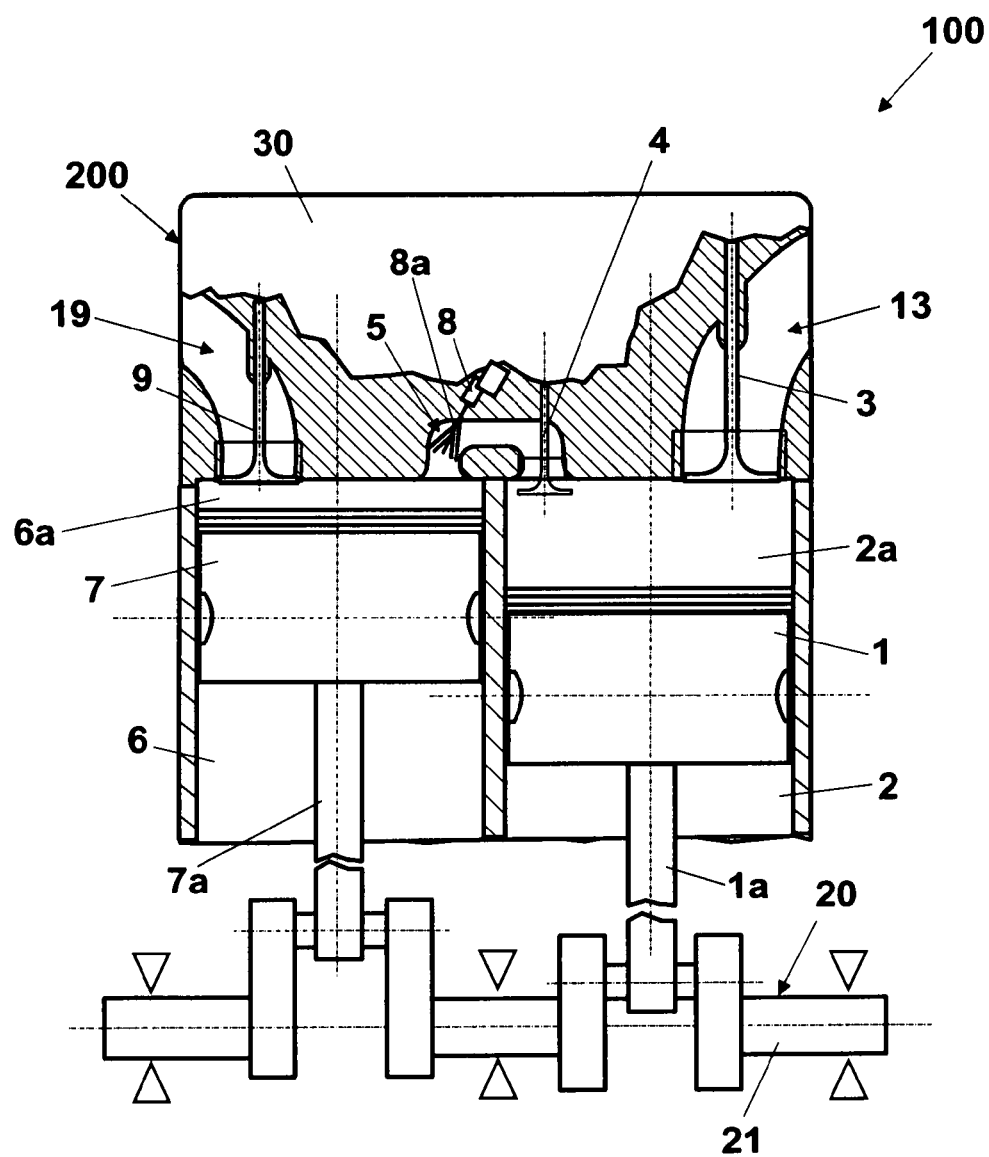
FIG. 2 diagrammatically shows a cross sectional view of an exemplary embodiment of a compression-ignition engine in a successive phase of the engine cycle.
Figure 3:
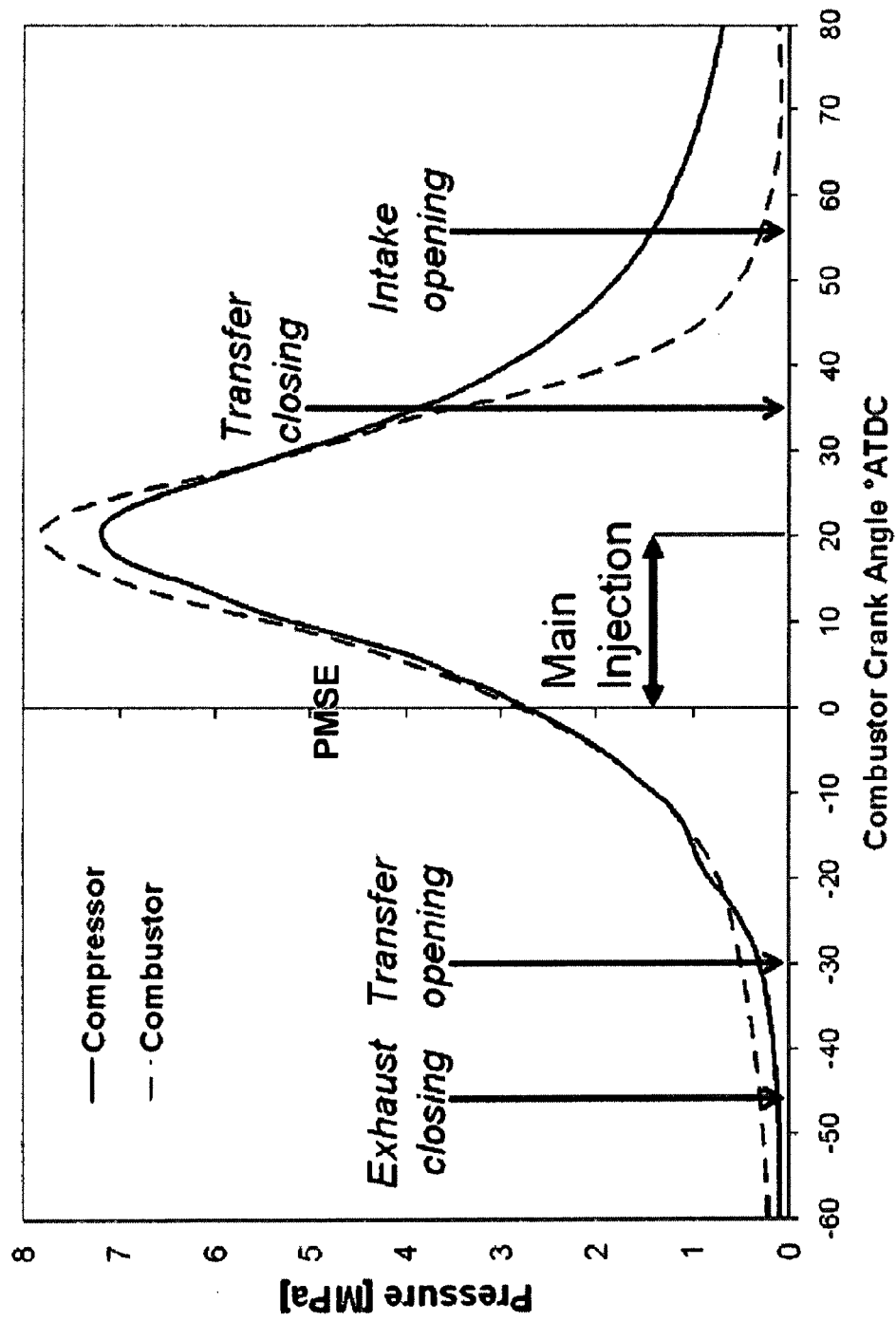
FIG. 3 shows a diagram of pressures responsive to the crankshaft angle of the crankshaft mechanism where in the vicinity of the ETDC the instants of opening and closing the valves and the phase shift of the fuel injection are indicated.

With reference to FIGS. 1 and 2, a compression-ignition "split-cycle" engine 100, according to the invention, comprises a cylinder block 200 with an expansion cylinder 6 associated with a relative expansion piston 7 that is adapted to move alternatively between a top dead center (ETDC) and a bottom dead center (EBDC) in expansion cylinder 6 by means of a crankshaft mechanism 20. In particular, crankshaft mechanism 20 causes a predetermined position of expansion piston 7 to correspond always to a predetermined crankshaft angle. In particular, as shown in FIG. 3 the ETDC of expansion piston 7 corresponds to a crankshaft angle of 0°.

Furthermore, cylinder block 200 comprises a compression cylinder 2 associated with a relative compression piston 1 that is adapted to move alternatively between a top dead center (CTDC) and a bottom dead center (CBDC) in compression cylinder 2 according to a predetermined delay with respect to the crankshaft angle of the expansion piston 7. Compression piston 1 is in turn connected to crankshaft mechanism 20 by a crank member 7a. Expansion cylinder 6 is arranged near to compression cylinder 2. In detail, compression cylinder 2 and expansion cylinder 6 have a same displacement, or alternatively, they may have a different displacement. In the latter case it is advantageous that the higher displacement is that of expansion cylinder 6.

Cylinder block 200 comprises, furthermore, a cylinder head 30, which closes cylinders 2 and 6 and in which at least one crossover passageway is provided 5, which connects the two cylinders 2/6 and comprises a compression-sided opening 5a towards compression cylinder 2 and a expansion-sided opening 5b towards expansion cylinder 6. Cylinder head 30 comprises, furthermore, at least one intake valve 3 that faces compression cylinder 2 for intake of a comburent fluid, for example air, into compression cylinder 2, and an exhaust valve 9 that faces expansion cylinder 6 for exhaustion of burnt gas at the outlet of expansion cylinder 6. In detail, intake valve 3 opens/closes selectively an intake duct 13, whereas exhaust valve 9 opens/closes selectively a discharge duct 19.

In particular, in crossover passageway 5 a transfer valve 4 is arranged at compression-sided opening 5a, whereas expansion-sided opening 5b is in constant communication with expansion cylinder 6 with which it forms a single combustion environment 6a. at the other side the only compression cylinder 2 defines a second environment 2a. So, between expansion cylinder 6 and crossover passageway there are not any valves.

Furthermore, engine 100 comprises a means for causing an open and close movement of transfer valve 4 at predetermined moments of the alternative cycle of pistons 1/7, in particular in phases respectively in the compression in compression cylinder 2, and in the expansion in expansion cylinder 6.

In addition, a means is provided for causing an open and close movement of exhaust valve 9 at predetermined moments of the alternative cycle of pistons 1/7, as described below in detail.

Figure 4:
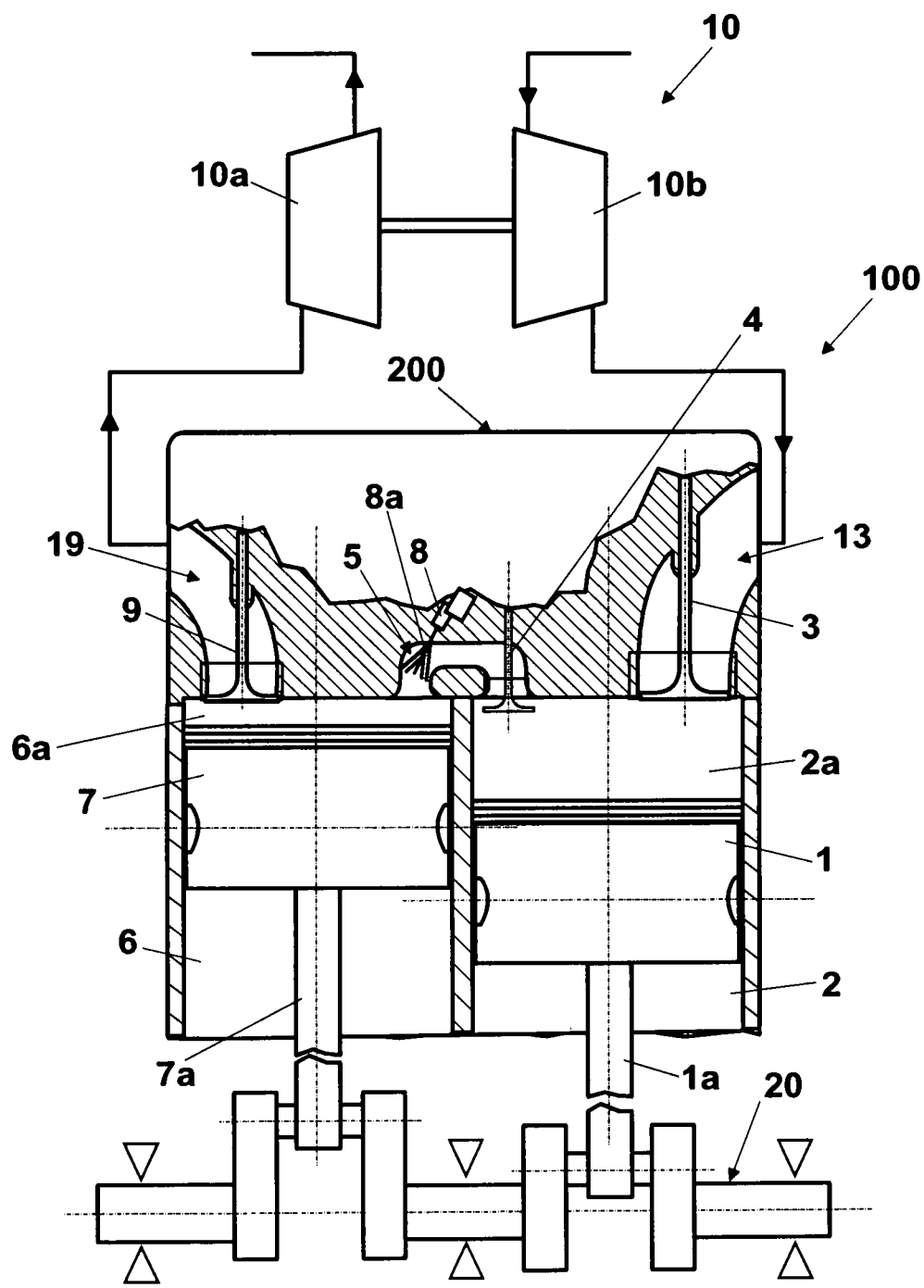
FIG. 4 diagrammatically shows a cross sectional view of an exemplary embodiment of the engine of FIG. 1, having a supercharger.

In particular, the means for causing an open and close movement of transfer valve 4 and the means for causing the open and close movement of exhaust valve 9 and of intake valve 3, comprises for example a mechanism that comprises a cam shaft (not shown) that receives an actuating movement by crankshaft mechanism 20 and allows a suitable phasing of the alternated movement of two pistons 1/7, with the open and close movement of valves 3/4 and 9. In particular, crankshaft mechanism 20 comprises a single shaft 21 that operates by means of crank members 1a and 7a respective pistons 1 and 7, as shown in FIGS. 1, 2 and 4. In a possible exemplary embodiment, crankshaft mechanism 20 of pistons 1 and 7 is of the type master connecting rod-link rod.

Alternatively, in a way not shown, crankshaft mechanism 20 comprises a first drive shaft that operates the expansion piston and a second drive shaft that operates the compression piston. The first and second drive shafts are connected to each other such that they maintain a same speed of rotation.

Furthermore, at crossover passageway 5 an injection means 8 is provided for injecting fuel in crossover passageway 5 or in expansion cylinder 6 at predetermined moments of the alternative cycle of pistons 1/7, so that a compression-ignition of the injected fuel 8a (FIG. 2) occurs at reaching a compression-ignition temperature. In detail, the injection means comprises at least one injector 8, in particular a pressurized injector, which faces crossover passageway 5 or expansion cylinder 6.

In particular, in a cycle of the engine, as shown in FIG. 3, transfer valve 4 opens in advance with respect to the crankshaft angle of the ETDC, with an open movement in advance 20° of crankshaft angle or more, in particular, with an advance open movement of 30°, as shown in the chart of FIG. 3. More in particular, transfer valve 4 opens in advance with respect to the crankshaft angle of the ETDC, according to an advance angle set between −80° and −25°, in particular between −35° and −30°. This way, between the opening instant of transfer valve 4 up to reaching the ETDC there is a substantial equalization of instantaneous pressure between the compression cylinder and the expansion cylinder, and between the ETDC and the CTDC a substantially total transfer occurs of the comburent fluid between compression cylinder 2 and expansion cylinder 6 through crossover passageway 5.

Furthermore, injector 8 injects the fuel starting from the achievement of the ETDC by expansion piston 7, such that this step of injection of fuel occurs simultaneously to transfer the comburent fluid through crossover passageway 5.

This way, before opening transfer valve 4, there are substantially only two environments 2a and 6a, one defined by compression cylinder 2 and the other defined by crossover passageway 5 that defines a single common environment 6a along with expansion cylinder 6. Then, when opening transfer valve 4, which is carried out at least 20° in advance with respect to the ETDC, there is not a substantial transfer of comburent fluid in crossover passageway 5, since the pressure in compression cylinder 2 is about equal to the pressure in expansion cylinder 6. With the progress of the cycle, since the two cylinders communicate with each other via crossover passageway 5, the pressure increases in a way identical everywhere, as shown in FIG. 3, by the contemporaneous rising stroke of the two pistons (FIG. 2), up to reaching the ETDC. Then, passed the ETDC, compression piston 1 continues to rise and expansion piston 7 starts going down, causing a total transfer of comburent fluid between the two cylinders through crossover passageway 5. Simultaneously to the transfer, the injection 8a is carried out (FIG. 2) and the subsequent combustion of all the fuel occurs. Since the transfer causes a high turbulence, the phenomena of evaporation and mixing between the fuel and the comburent fluid occur in a better way than a conventional diesel engine. In particular, the evaporation is carried out in a quicker way and the mixture obtained is much more homogeneous. This way, a very effective combustion is obtained and a subsequent very low fraction of unburnt particles, in particular carbonaceous dust, is delivered in the exhaust gas.

In addition, the injection can be provided by injector 8 of a small amount of fuel so-called "pilot injections" in advance with respect to the ETDC in such a way that it preheats the combustion environment 6a. This way, the pilot injections allow ensuring a successful direct ignition of the fuel charge that is injected starting from the achievement of the ETDC.

According to a preferred cycle of the engine, the means for causing an open and close movement of the exhaust valve are adapted to block exhaust valve 9 with a predetermined advance with respect to the achievement by the expansion piston of the ETDC, such that in expansion cylinder 6 a compression occurs of a part of the exhaust gas up to a predetermined pressure, and the means for causing an open and close movement of transfer valve 4 open transfer valve 4 when compression piston 1 has compressed comburent fluid in compression cylinder 2 up to a pressure substantially equal to that present in expansion cylinder 6, such that the transfer of comburent fluid is carried out through crossover passageway 5 by compression cylinder 2 to expansion cylinder 6 and the autoignition of the fuel occurs substantially at the same time. This way, the compressed mixture of fuel and comburent fluid is transferred into expansion cylinder 6 during the combustion phase through crossover passageway 5, after opening transfer valve 4. Therefore, the crossover passageway has a pure transfer function and is not a storage reservoir of the pressurized comburent fluid. This makes it possible to eliminate loss of lamination owing to the presence of a further transfer valve arranged at the opening crossover passageway 5 towards expansion cylinder 6, like in the engines of known type.

In addition, in crossover passageway 5 an adjustment element can be provided, not shown, for adjusting the variation of operation conditions of the engine, in particular this adjusting element can be conformed as a bolt or a blade.

In other words, during the operation of the engine, as shown in FIG. 1, owing to the going down movement of compression piston 1, a amount of air is introduced into compression cylinder 2 through intake valve 3 and intake duct 13.

Then, as shown in FIG. 2, the step follows of closing intake valve 3 and the compression occurs of the comburent fluid that can be air or air mixed with exhaust gas, which as known allows reducing the NOx. It can also be a desired inert gas enriched with oxygen.

Owing to the rise of compression piston 1 and of expansion piston 7 with a suitable timing as described above, transfer valve 4 located at the exit of compression cylinder 2 is open such that the comburent fluid flows through crossover passageway 5 towards expansion cylinder 6, whose expansion piston 7 moves with suitable angular phase shift in delay with respect to compression piston 1.

During the descent of expansion piston 7 in expansion cylinder 6, with a suitable timing as described above transfer valve 4 is closed. Owing to the descent of expansion piston 7, the expansion step takes place in expansion cylinder 6, whereas in compression cylinder 2 a step of intake starts. Once completed the expansion step in expansion cylinder 6, exhaust valve 9 opens in order to open exhaust channel 19, through which the burnt gas id discharged, and the valve remains open for a suitable time during the stroke of rise of expansion piston 7 in expansion cylinder 6.

In particular, the angular phase shift between the crankshaft angle of compression piston 1 with respect to the crankshaft angle of expansion piston 7 is set between 10° and 45°, preferably between 20° and 30°, in particular 25°. The angular phase shift between pistons 1/7 has the aim to cause a full transfer of the comburent fluid compressed by compression cylinder 2 to expansion cylinder 6.

In addition, a means can be provided for adjusting the angular phase shift between compression piston 1 and expansion piston 7 versus the operation conditions of the engine.

More in particular, as shown in FIG. 3, the angular phase shift between the crankshaft angle of compression piston 1 and the crankshaft angle of combustion piston 7 is such that all or part of the combustion takes place while transferring the comburent fluid from compression cylinder 2 to expansion cylinder 6.

Furthermore, always as shown in the chart of FIG. 3, it is apparent how the pressure difference between compression cylinder 2 and expansion cylinder 6 is low during all the step between opening and closing transfer valve 4 and, in particular, the two pressures are identical also before opening transfer valve 4, owing to the described advanced closing of exhaust valve 9. The progress with very close pressures between compression cylinder 2 and expansion cylinder 6 reduces the head loss for lamination during the transients of opening and closing transfer valve 4 between crossover passageway 5 and compression cylinder 2.

Alternatively, in a way not shown, transfer valve 4 can open in advance with respect to closing exhaust valve 9, so that in expansion cylinder 6 a washing out of the exhaust gas with fresh air is effected before closing exhaust valve 9. Even in this case, when closing exhaust valve 9 there is a growth of the pressure in the two cylinders expansion 6 and compressor 2, with possibility to reach larger power.

In particular, the engine 100 uses the "split-cycle" solution, according to which the steps of intake and of compression are carried out in an environment different with respect to that in which the steps occur of combustion and exhaust (expansion cylinder 6). The engine works on the principle of feeding gradually in expansion cylinder 6, during the combustion step, a mixture of fuel 8a, inserted by injector 8, and compressed comburent fluid to achieve the result of reducing the emissions of dust and of nitrogen oxides with respect to the values that are typical of a conventional compression-ignition engine. The transfer of comburent fluid in expansion cylinder 6 is made only opening valve 4, which faces the compression cylinder, and through crossover passageway 5 in which or after which fuel 8a is injected.

Owing to the peculiarity of introducing the fuel and the comburent fluid in expansion cylinder 6, the engine 100 allows low emissions of dust and of nitrogen oxides and can work with good efficiency of combustion even at a speed higher than a maximum admissible in the conventional compression-ignition engines.

In addition, as shown in FIG. 4, the engine 100 can be supercharged, for example by a turbo supercharger 10, comprising a turbine 10a and a compressor 10b of type similar to those used in conventional compression-ignition engines, for increasing the specific power of the engine same. In this case, supercharging pressures can be used that are higher than the maximum admissible pressures in conventional compression-ignition engines, since in engine 100 the pressure gradient during the combustion are lower than those typical of conventional compression-ignition engines.

In further exemplary embodiments of the engine, more crossover passageways 5 can be provided between expansion cylinder 6 and compression cylinder 2, wherein each crossover passageway 5 has at least one respective transfer valve 4 arranged at the inlet mouth of crossover passageway 5 from compression cylinder 2, and is in constant communication with expansion cylinder 6. This solution is feasible for example for high-powered engines.

In the same way, for the intake in the compression cylinder, as well as for the exhaust from expansion cylinder, more intake and exhaust valves can be provided associated with respective intake and exhaust ducts.

A further exemplary embodiment of the engine, not shown, can comprise a plurality of compression cylinders associated respectively to a plurality of expansion cylinders arranged and combined to each other in different configurations.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A compression-ignition "split-cycle" engine comprising:
    a cylinder block:
    an expansion cylinder having an expansion piston that is adapted to move alternatively in said expansion cylinder between a top dead center (ETDC) and a bottom dead center (EBDC) by a crankshaft mechanism, said crankshaft mechanism causing always a predetermined position of said expansion piston to correspond to a predetermined crankshaft angle;
    a compression cylinder having a compression piston that is adapted to move alternatively in said compression cylinder between a top dead center (CTDC) and a bottom dead center (CBDC) according to a predetermined angular phase shift in delay with respect to the crankshaft angle of said expansion cylinder, said compression cylinder arranged adjacent to said expansion cylinder;
    a cylinder head that closes said compression and expansion cylinders, and in which at least one crossover passageway is provided that connects said cylinders and comprises a compression-sided opening and an expansion-sided opening, said cylinder head comprising at least one intake valve which faces said compression cylinder for introducing a comburent fluid in said compression cylinder and at least one exhaust valve that faces said expansion cylinder for exhaustion of burnt gas exiting from said expansion cylinder;
    at least one transfer valve arranged at the compression-sided opening of the crossover passageway;
    a transfer valve gear for causing an open and close movement of said transfer valve at predetermined moments of the alternative cycle of said pistons;
    an intake valve gear for causing an open and close movement of said intake valve and an exhaust valve gear for causing an open and close movement of said exhaust valve at predetermined moments of the alternative cycle of said pistons;
    a fuel injector into said crossover passageway or in said expansion cylinder at predetermined moments of the alternative cycle of said pistons so that ignition of the fuel injected is caused upon reaching a temperature of autoignition by compression;
    wherein said crossover passageway defines a single combustion chamber in combination with said expansion cylinder with which it is in constant communication,
    wherein said transfer valve gear is arranged to open said transfer valve in advance with respect to the crankshaft angle of said ETDC, with an advance open movement higher or equal to 20° of crankshaft angle, in such a way that:
    from the opening instant of said transfer valve up to reaching said ETDC, there is a substantial equalization of instantaneous pressure between said compression cylinder and said expansion cylinder, and
    between said ETDC and said CTDC, a substantially total transfer occurs of said comburent fluid between said compression cylinder and said expansion cylinder through said crossover passageway;
    and wherein said fuel injector is arranged to inject said fuel substantially starting from the achievement of said ETDC by said expansion piston, such that said injection of fuel occurs simultaneously to the transfer of said comburent fluid through said crossover passageway.

2. The engine, according to claim 1, wherein said transfer valve gear is arranged to open said transfer valve in advance with respect to the crankshaft angle of said ETDC, with an advance open movement set between −80° and −25°.

3. The engine, according to claim 1, wherein said fuel injector is arranged to inject a small amount of fuel, so-called pilot injections, in advance with respect to the ETDC for pre-heating the combustion environment.

4. The engine, according to claim 1, wherein said exhaust valve gear is arranged to block said exhaust valve with a predetermined advance angle with respect to the achievement by said expansion piston of said ETDC, so that in said expansion cylinder, a compression occurs of a part of exhaust gas up to a predetermined pressure, and said transfer valve gear is arranged to open said transfer valve when said compression piston has compressed comburent fluid in said compression cylinder up to a pressure substantially equal to that present in said expansion cylinder, such that said transfer of said comburent fluid is carried out through said crossover passageway from said compression cylinder to said expansion cylinder and the autoignition of the fuel substantially occur at the same time, in particular said determined advance angle closure of said exhaust valve with respect to said ETDC is at least of 40°.

5. The engine, according to claim 1, wherein said angular phase shift between the crankshaft angle of said compression piston with respect to the crankshaft angle of said expansion piston is set between 10° and 45° wherein an angular phase shifter is provided for adjusting said angular phase shift between said compression piston and said expansion piston versus the operation conditions of the engine.

6. The engine, according to claim 1, wherein said transfer valve gear is arranged to open said transfer valve in advance with respect to closing said exhaust valve, so that in the expansion cylinder, a washing out occurs with fresh comburent fluid of the exhaust gas before closing said exhaust valve, such that when closing the exhaust valve, there is a growth of pressure in the two expansion and compression cylinders in order to reach higher power.

7. The engine, according to claim 1, wherein said crankshaft mechanism comprises a single drive shaft that operates said compression piston and said expansion piston.

8. The engine, according to claim 1, wherein said crankshaft mechanism comprises a first drive shaft that operates said expansion piston, and a second drive shaft that operates said compression piston, said first and second drive shaft connected to each other keeping a same speed of rotation.

9. The engine, according to claim 1, wherein said crankshaft mechanism of said pistons of said compression cylinder and of said expansion cylinder is of the type master connecting rod-link rod.

10. The engine, according to claim 1, wherein several crossover passageways are provided between said expansion cylinder and said compression cylinder, wherein each of said crossover passageways has at least one respective transfer valve arranged at the compression-sided opening of the crossover passageway, and is in constant communication with said expansion cylinder.

11. The engine, according to claim 1, wherein for intake in the compression cylinder, as well as for exhaust from the expansion cylinder, more intake and exhaust valves are provided associated with respective intake and exhaust ducts.

12. The engine, according to claim 1, wherein said engine is associated with a supercharger that is adapted to obtain a higher specific power of the engine and also better thermodynamic efficiency.

13. The engine, according to claim 1, wherein said compression cylinder and said expansion cylinder have a same displacement or a different displacement, in case of a different displacement, the higher displacement is in the expansion cylinder.

14. The engine, according to claim 1, wherein said engine comprises a plurality of compression cylinders associated respectively to a plurality of expansion cylinders arranged and combined to each other in a determined way.

15. The engine, according to claim 1, wherein said crossover passageway provides an adjusting element that is adapted to adjust the cross section and/or the volume of said crossover passageway in order to fit it to the different operation conditions of the engine, said adjusting element is a bolt or a blade.

16. The engine, according to claim 15, wherein said adjusting element is conformed as a bolt or a blade.

17. The engine, according to claim 2, wherein said transfer valve gear is arranged to open said transfer valve in advance with respect to the crankshaft angle of said ETDC, with an advance open movement set between −35° and −30°.

18. The engine, according to claim 5, wherein said angular phase shift between the crankshaft angle of said compression piston with respect to the crankshaft angle of said expansion piston is set between 20° and 30°.

19. The engine, according to claim 5, wherein said angular phase shift between the crankshaft angle of said compression piston with respect to the crankshaft angle of said expansion piston is 25°.

\* \* \* \* \*